May 21, 1935.  D. GREGG  2,002,058
FLUID CLUTCH
Filed Jan. 30, 1932   3 Sheets-Sheet 1

INVENTOR.
David Gregg
BY McConkey & Smith
ATTORNEYS.

May 21, 1935.  D. GREGG  2,002,058
FLUID CLUTCH
Filed Jan. 30, 1932  3 Sheets-Sheet 3

INVENTOR.
David Gregg
BY McCauley & Smith
ATTORNEYS.

Patented May 21, 1935

2,002,058

UNITED STATES PATENT OFFICE 2,002,058

FLUID CLUTCH

David Gregg, Caldwell, N. J., assignor, by mesne assignments, to Eclipse Aviation Corporation, East Orange, N. J., a corporation of New Jersey Application January 30, 1932, Serial No. 589,909

26 Claims. (Cl. 192—85)

This invention relates to clutches, and more particularly to clutches of the hydraulic actuated type.

An object of the invention is to provide a fluid actuated clutch which will temporarily disconnect the driving from the driven member upon sudden variation in clutch speed.

Another object of the invention is to provide a fluid actuated clutch that will automatically release when the driving member is accelerated or decelerated beyond a predetermined rate.

Another object of the invention is to provide a fluid actuated clutch in which the pressure may be relieved at the clutch periphery.

Another object of the invention is to provide a fluid actuated clutch in which the centrifugal pressure of the fluid may be temporarily relieved upon acceleration or deceleration of the clutch.

Another object of the invention is to provide a fluid actuated clutch for a supercharger drive in which sudden fluctuations of the supercharger load will temporarily release the clutch and prevent damage of the supercharger or its driving gear train.

Other objects of the invention will appear from the following description, in connection with which a preferred embodiment of the invention has been illustrated in the accompanying drawings, in which.

For illustrative purposes, the clutch has been shown as incorporated in the driving train of a supercharger driving mechanism to which use the clutch is particularly adaptable because superchargers are usually driven at a high rate of speed and sudden fluctuations in speed of either the driving or driven shaft are apt to damage the supercharger or its driving train.

Figure 1:
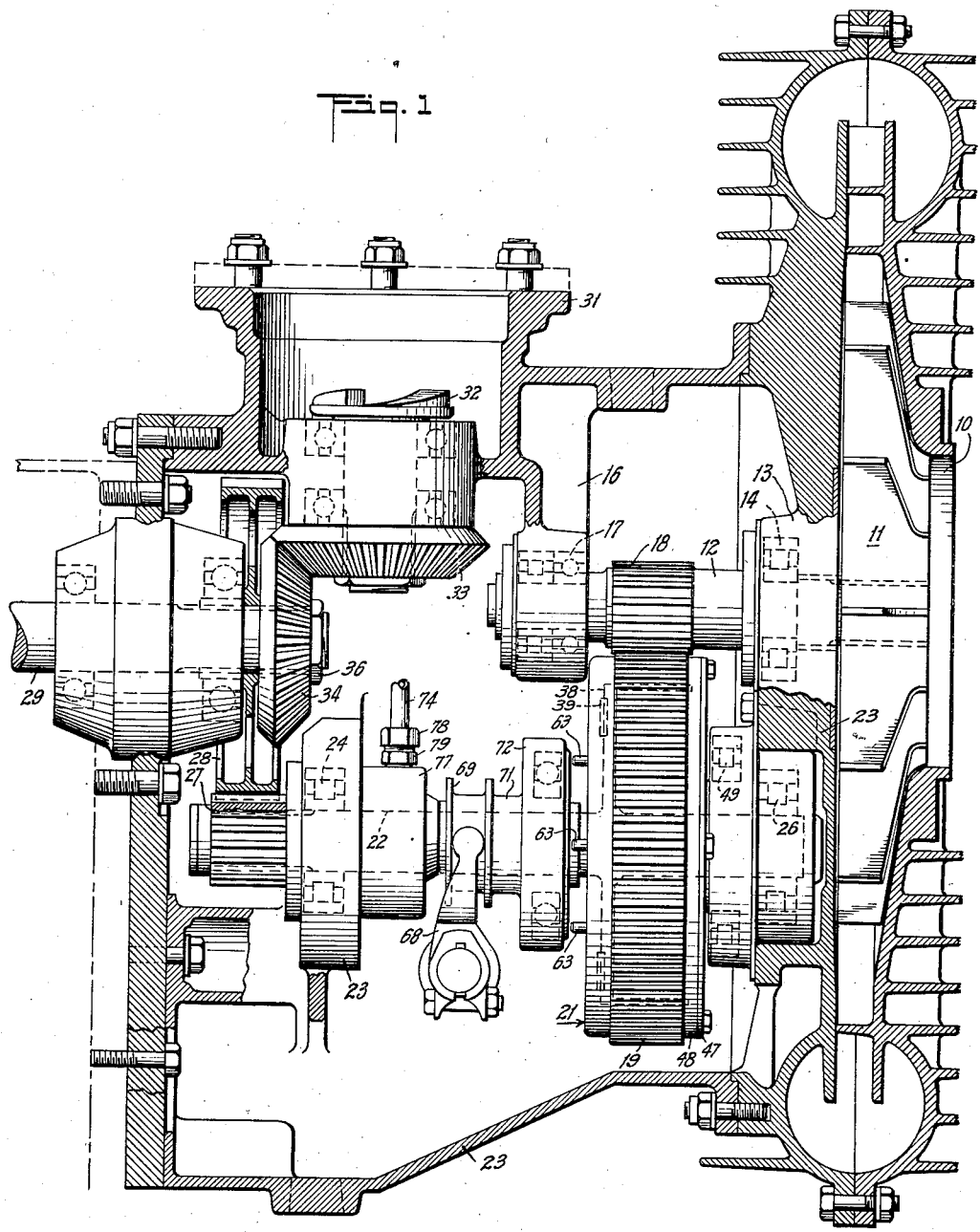
Fig. 1 is an elevational view partly in section of the improved clutch as applied to a supercharger driving mechanism.

Referring to Fig. 1, 10 represents the supercharger having an impeller 11 that is mounted upon shaft 12 rotatably mounted in casing 13 by bearing 14. Shaft 12 has its inner end supported in web 16 by bearing 17 and is provided with a gear 18 in mesh with gear 19 forming a part of the improved clutch generally designated by 21. Clutch 21 is driven by a hollow counter shaft 22 rotatably mounted in gear housing 23 by bearings 24 and 26, the shaft 22 having a gear 27 in mesh with a gear 28 secured to the engine driven shaft 29.

The upper portion of housing 23 may, if desired, be provided with a flange 31, to which may be secured a starting mechanism of any desired type (not shown) which is adapted to engage clutch 32 for starting the engine through gears 33 and 34, gear 34 being secured to shaft 29 by nut 36.

Clutch 21 comprises a radially extending disc 38 having a friction surface 39 secured thereto, which disc is preferably integral with shaft 22. A second radial disc 41, having a friction surface 39a secured thereto, is slidably mounted upon shaft 22 by means of splines 42, and both discs 38 and 41 are provided with telescopic peripheral flanges 43 and 44 respectively which are contiguous with each other and form with the discs a container into which fluid under pressure may be introduced for moving the discs relatively to one another and force the friction surfaces 39 and 39a into engagement with the side flanges 46 and 47 of the driven toothed member 48. The member 47 is preferably rotatably mounted with respect to the housing 23 by means of bearing 49 that preferably has a slight axial movement in order to permit a bodily shifting of the driven member and an equalization of the pressure upon flanges 46 and 47. Each of the flanges 43 and 44 is provided with one or more holes 51 and 52 respectively which are permanently in angular alignment and communicate with an annular groove 53 formed in the toothed member 48, the groove 53 being in communication exteriorly of the clutch by passageways 54.

Within the clutch is a closure or valve member 55 having a radial flange 56 provided with openings 55a for equalizing the pressure on each side thereof, and a peripheral flange 57 which, in its normal position, is adapted to close the opening 52 and allow pressure to build up within the clutch and expand the discs 41 and 38 into frictional contact with the driven toothed member 48. The closure member is preferably guided by its flange 57 within flange 44 and is provided with a pair of angularly spaced openings 58 in the plane of opening 52 but normally held out of angular alignment therewith by a forked leaf spring 61 having its inner end secured to disc 38 preferably by a split shank stud 62, while the outer end straddles a stud 63 having a shoulder 64, which has preferably a riveted connection with the valve member 55.

Arcuate slots 66 are provided in disc 38 whereby studs 63 may move angularly with respect to the disc but which, in their normal position, are held in the central position thereof wherein opening 52 is sealed. A suitable packing gasket 50 is carried by the studs 63 to seal the slots 66, but if desired the packing may be omitted and slots 66 used as an overflow. If no packing is used, spring 75 should be of sufficient strength to cause initial engagement of the clutch prior to the speed at which the centrifugal force is sufficient to actuate it. Flange 57 of the closure member is also provided with a plurality of openings 67 that are adapted to align with opening 52 when the closure member is moved axially toward the right, as viewed in Fig. 2, by manual operation of a shifter lever 68 which acts through collar 69 formed on sleeve 71 to cause thrust bearing 72 to engage the outer end of pins 63 and axially move the closure member 55 against the tension of spring 75 to a position wherein openings 67 are in alignment with the openings 52.

Provision is made for introducing fluid into the clutch by means of a conduit 74 connected to a source of fluid pressure, such as the engine oil pump (not shown) and having a shut-off valve 76. Conduit 74 is preferably secured to the bearing cage 77 by a connection 78 and fitting 79 that is in communication with an annular groove 81 formed on shaft 22 and which is in communication with the interior thereof by radial passage 82, the fluid being prevented from flowing along the outside of the shaft by a collar 84 having imbedded therein sealing gaskets 85 surrounding the shaft on opposite sides of groove 81.

Figure 2:
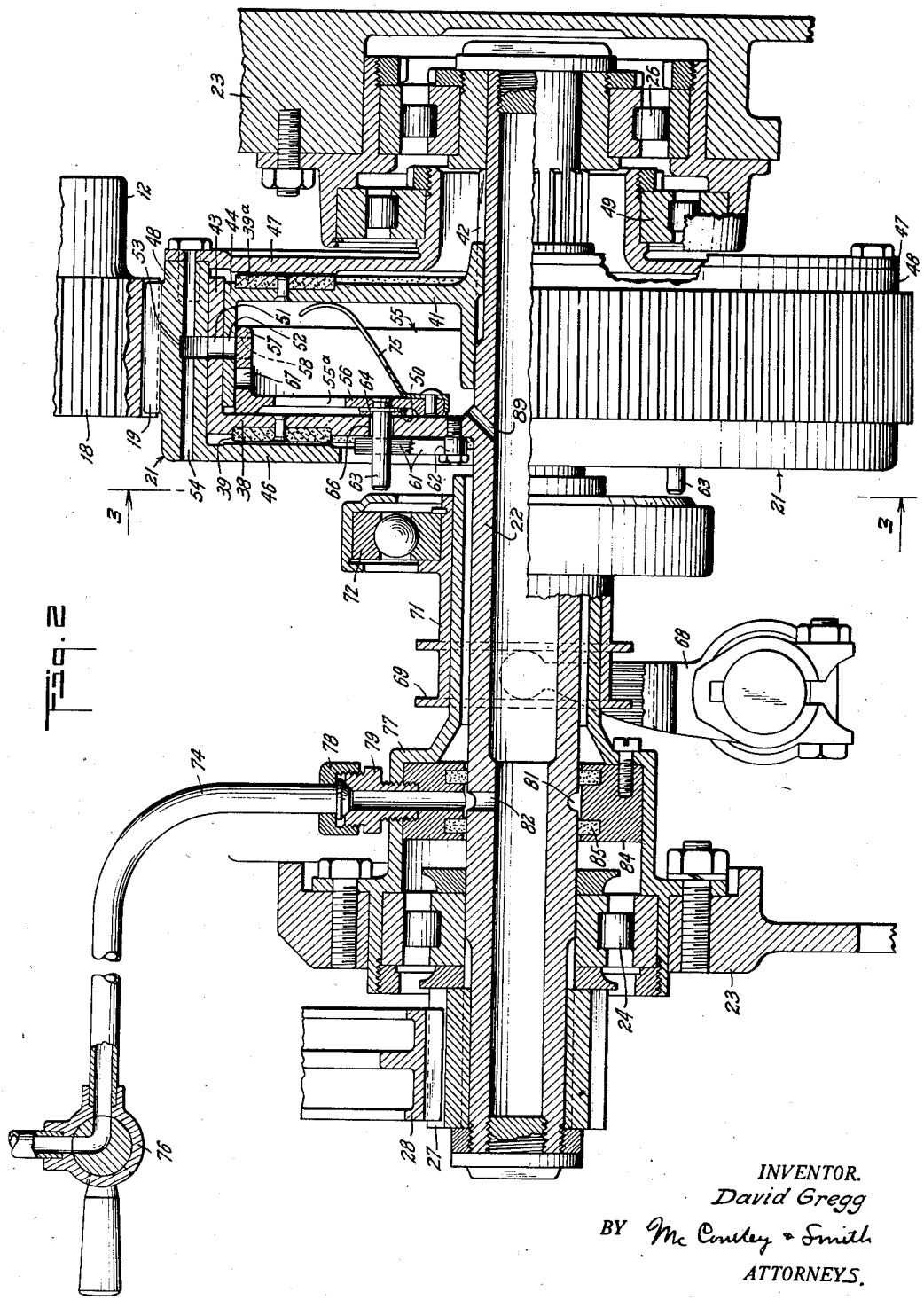
Fig. 2 is an enlarged sectional view partly in elevation of the clutch illustrated in Fig. 1.
Figure 3:
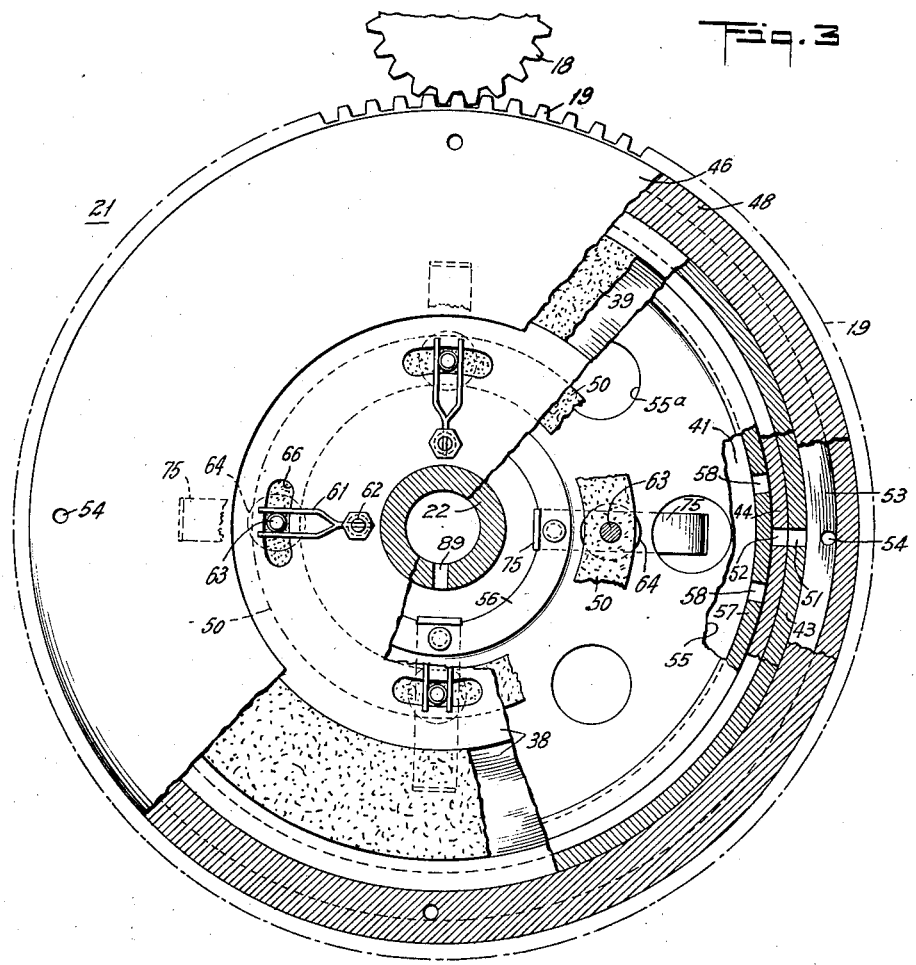
Fig. 3 is a view taken in the direction of the arrows 3—3 of Fig. 2, in which certain of the parts have been broken away to illustrate the internal construction; and, Fig. 4 is a perspective view of the peripheral portion of the clutch illustrating the arrangement of the various parts.
Figure 4:
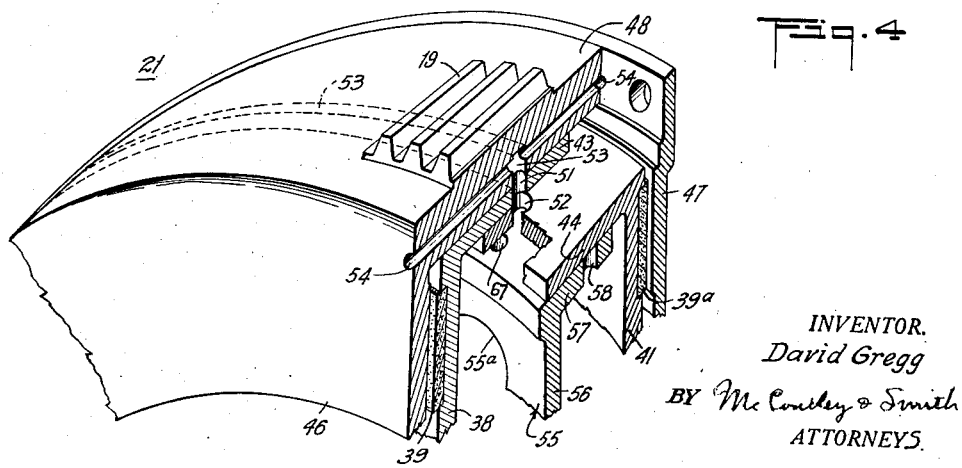

In the operation of the clutch, after the engine has been started, valve 76 is placed in the open position and the operating lever 68 is rotated to a position whereby thrust bearing 72 is free of the pin 63, as shown in Fig. 2. Fluid may then pass through pipe 74 to the interior of shaft 22 and through opening 89 to the enclosure between discs 38 and 41, which will be forced apart by the fluid pressure and cause their friction surfaces 39 and 39a to engage the driven flanges 46 and 47 of the toothed member 48.

In the normal driving operation, the fluid pressure within the clutch will maintain the frictional engagement without interruption, but if an increased load should be applied to driven gear 18 or if for any other reason gear 18 is suddenly reduced in speed, the closure member 55 will rotate relatively to the clutch because of its inertia, and bring one of the openings 58 into alignment with opening 52, and the pressure within the clutch will be relieved by passage of the fluid outwardly through the aligned openings 51, 52 and 53 and into passage 54 to the outside of the clutch. Release of the internal pressure will permit the clutch to slip and relieve the load upon the driving parts.

If the driving shaft 22 should be suddenly decreased in speed or the driven member increased in speed, the closure member 55 will move in the reverse direction and permit one of the holes 58 to align with the peripheral relief openings and the pressure within the clutch will be relieved in the same manner as before.

It is to be understood that release of the fluid pressure due to fluctuations in load will only be temporary, for as soon as the acceleration or deceleration of the clutch is less than a predetermined amount, springs 61 will return the closure member 55 to its normal central position and the pressure within the clutch will be restored. If it is desired to disengage the clutch by a manual operation, lever 68 may be rotated in a clockwise direction, whereby thrust bearing 72 will contact with pins 63 and move closure member 55 axially to a position whereby holes 67 will align with holes 52 and relieve the pressure within the clutch.

It may be observed from the above description that the improved clutch has its pressure relieved through peripheral openings. This is very important in hydraulic clutches, for during the operation of the clutch, any fluid therein is subject not only to the pressure within the conduit 74 but is also influenced by the pressure due to the centrifugal force of the rotating fluid contained in the clutch. Under certain conditions, the centrifugal pressure is high enough to cause a driving engagement of the clutch, even though the supply pressure may be cut off and the clutch will remain in engagement regardless of the operator's efforts to disengage it.

In the present clutch, the speed of rotation will have no effect on disengagement, for the relief openings are at the periphery of the clutch and the centrifugal pressure, as well as the line pressure, will be relieved whenever the closure member is in position to unseal the aligned openings in the flanges of the expansible members.

While a preferred embodiment of the invention has been illustrated and described, it is understood that this showing and description are illustrative only and that the invention is not regarded as limited to the form shown and described, or otherwise, except by the terms of the following claims:

What is claimed is:

1. A fluid actuated clutch comprising a driving member, a driven member, pressure actuated means including an expansible fluid chamber for engaging the clutch, means forming an opening in the periphery of the chamber for releasing the clutch, and inertia operated means for controlling the opening.

2. A fluid actuated clutch comprising a driving member, a driven member, pressure actuated means rotatable with the members including an expansible fluid chamber for engaging the clutch, and inertia actuated means for relieving pressure due to centrifugal force of the fluid in the chamber to disengage the clutch.

3. A fluid actuated clutch comprising a driving member, a driven member, fluid pressure means subject to centrifugal action for engaging the clutch, and means operated by a sudden reduction in clutch speed for relieving fluid pressure due to the centrifugal force of the fluid.

4. A fluid actuated clutch comprising a driving member, a driven member, fluid pressure means subject to centrifugal action for engaging the clutch, and a resiliently mounted member operated by a sudden reduction in clutch speed for relieving fluid pressure due to the centrifugal force of the fluid.

5. A fluid actuated clutch comprising a driven member, means forming an expansible driving member having friction surfaces and forming a fluid container, means for introducing fluid pressure adjacent the axis of the container, and oscillatable inertia operated means for relieving pressure at the periphery of the container.

6. A fluid actuated clutch comprising a driven drum, means forming an expansible driving member concentric with the drum having friction surfaces adapted to contact the drum and forming a fluid container, means for introducing fluid pressure adjacent the axis of the container, and means operable upon a sudden reduction in clutch speed to relieve pressure at the periphery of the container through the drum.

7. A fluid actuated clutch comprising a driven member, means forming an expansible driving member forming a fluid container, a shaft therefor, means for introducing fluid pressure to the container through the shaft, and means including an inertia actuated oscillatable member for relieving pressure at the periphery of the container.

8. A fluid actuated clutch comprising a driven member, means forming an expansible driving member constituting a fluid container having a peripheral opening, a shaft therefor, means for introducing fluid pressure to the container through the shaft, and an inertia operated member controlling said opening for relieving pressure at the periphery of the container.

9. A fluid actuated clutch comprising a driven member, driving means including axially movable members having peripheral overlapping flanges enclosing a fluid chamber, means for venting the container through the flanges, and means for opening and closing the venting means to relieve the fluid pressure in the container.

10. A fluid actuated clutch comprising a driven member, driving means including axially movable members having peripheral overlapping flanges enclosing a fluid chamber, means for venting the container through the flanges, and an inertia actuated member for opening and closing the venting means to relieve the fluid pressure in the container.

11. A fluid actuated clutch comprising a hollow driving shaft, relatively movable members drivably secured thereto, said members having peripheral overlapping flanges having aligned openings, a driven member adapted to be frictionally engaged by the movable members, means for introducing fluid pressure through the shaft for separating the movable members to engage the driven member, and a closure member for the openings adapted to be axially moved to relieve the fluid pressure and release the clutch.

12. A fluid actuated clutch comprising a hollow driving shaft, relatively movable members drivably secured thereto, said members having peripheral overlapping flanges having aligned openings, a driven member adapted to be frictionally engaged by the movable members, means for introducing fluid pressure through the shaft for separating the movable members to engage the driven member, a closure member for the openings adapted to be axially moved to relieve the fluid pressure and release the clutch, and said closure member having angular movement relative to the engaging members and adapted to relieve the pressure through the openings upon retardation of the driving member.

13. A fluid clutch comprising a driven member, a pair of telescopic driving members therein adapted to engage the driven member, means for introducing fluid pressure between the driving members, and inertia actuated means for relieving the pressure through the peripheries of the telescopic members to release the clutch.

14. A fluid clutch comprising a driven member, a pair of telescopic driving members therein adapted to engage the driven member, means for introducing fluid pressure between the driving members, and means for relieving the pressure through the peripheries of the telescopic members to release the clutch, said pressure releasing means being movable axially for relieving pressure at the will of the operator and movable angularly to relieve the pressure when the clutch speed is varied.

15. A fluid actuated clutch comprising a driven member, means forming an expansible driving member having a peripheral opening for relieving fluid pressure therein, an inertia actuated closure member rotatable with the driving member normally closing said opening, said closure member having a limited rotational movement relative to the driving member and adapted to unseal the opening when angularly moved from its normal position, and means for returning the closure member to its normal closed position.

16. A fluid actuated clutch comprising a driven member, means forming an expansible driving member having a peripheral opening for relieving fluid pressure therein, an inertia actuated closure member rotatable with the driving member normally closing said opening, said closure member having a limited rotational movement relative to the driving member and adapted to unseal the opening when angularly moved from its normal position, means for returning the closure member to its normal closed position, and means for manually operating the closure member to unseal the opening.

17. A fluid actuated clutch comprising a driving shaft, a pair of relatively movable discs secured thereto having telescoping inturned flanges forming a container, said flanges having aligned peripheral openings, a closure member concentric with the disc flanges having an inturned flange normally closing one of the peripheral openings, said closure flange having an opening adapted to align with the peripheral openings upon rotation relative to the disc, and a spring urging the closure member to its normal closed position.

18. A fluid actuated clutch comprising a driving shaft, a pair of relatively movable discs secured thereto having telescoping inturned flanges forming a container, said flanges having aligned peripheral openings, a closure member concentric with the disc flanges having an inturned flange normally closing one of the peripheral openings, said closure flange having an opening adapted to align with the peripheral openings upon rotation relative to the disc, a spring urging the closure member to its normal closed position, and means for manually moving the closure member axially to uncover the peripheral openings and relieve the pressure.

19. A fluid actuated clutch comprising a driven member, a driving member, one of said members being expansible by fluid pressure, and inertia operated means for relieving fluid pressure through the periphery of the clutch.

20. A fluid actuated clutch comprising a driven member, a driving member, one of said members being expansible by fluid pressure, and inertia operated means for relieving fluid pressure through the periphery of the clutch, said inertia means being normally in sealing position and operable in either direction to relieve the pressure.

21. A fluid actuated clutch comprising a driven member, a driving member, one of said members being expansible by fluid pressure to engage the clutch, inertia operated means for relieving fluid pressure through the periphery of the clutch, and manually operable means for relieving fluid pressure through the periphery of the clutch.

22. A fluid actuated clutch comprising a driven member, a driving member, one of said members being expansible by fluid pressure to engage the clutch, inertia operated means for relieving fluid pressure through the periphery of the clutch, and manually operable means for relieving fluid pressure through the periphery of the clutch, said manually operable means being axially slidable with respect to one of said members.

23. A fluid actuated clutch comprising a driven member, a driving member, one of said members being expansible by fluid pressure to engage the clutch, inertia operated means for relieving fluid pressure through the periphery of the clutch, and manually operable means for relieving fluid pressure through the periphery of the clutch, said manually operable means being adapted to coact with the inertia means for relieving the pressure at the will of the operator.

24. A fluid actuated clutch comprising a driven member, a driving member, said members being adapted to frictionally engage upon an increase in fluid pressure, oscillatable inertia operated means for relieving fluid pressure through the periphery of the clutch, and manually operable means adapted to move the oscillatable member axially of the clutch to relieve the fluid pressure at the will of the operator.

25. A fluid actuated clutch comprising a driven member, a driving member, said members being adapted to frictionally engage upon an increase in fluid pressure, inertia operated means for relieving fluid pressure through the periphery of the clutch, said inertia means being normally in sealing position and operable in either direction to relieve the fluid pressure, and manually operable means to relieve fluid pressure through the periphery of the clutch at the will of the operator.

26. A fluid actuated clutch comprising a driven member, a driving member, said members being adapted to frictionally engage upon an increase in fluid pressure, inertia operated means for relieving fluid pressure through the periphery of the clutch, said inertia means being normally in position to seal the clutch against loss of fluid and operable in either direction to relieve the fluid pressure, and manually operable means adapted to move the inertia means axially of the clutch to relieve the fluid pressure at the will of the operator.

DAVID GREGG.